No. 726,780. PATENTED APR. 28, 1903.
W. E. SPROUL.
PILE DRIVER.
APPLICATION FILED JUNE 4, 1902.
NO MODEL. 14 SHEETS—SHEET 6.
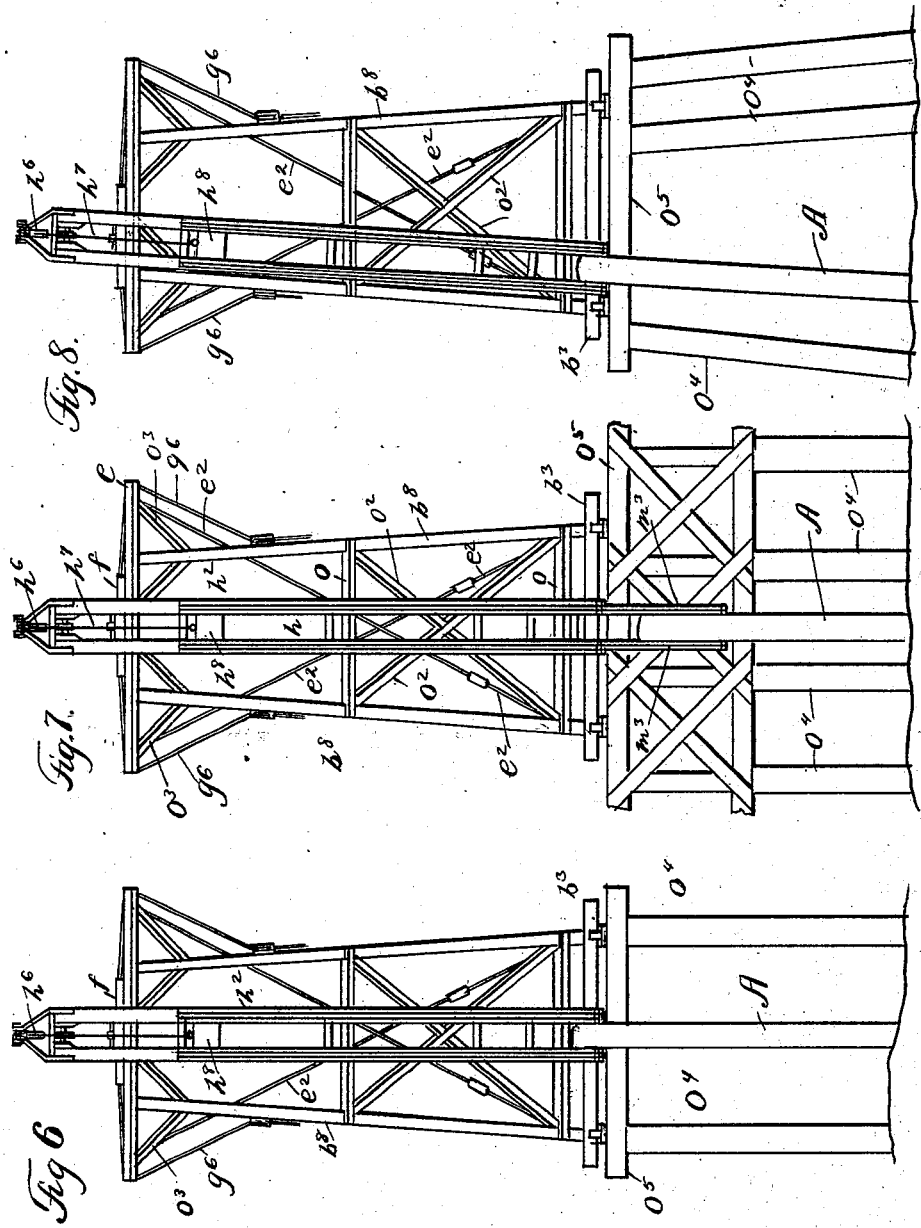
WITNESSES
INVENTOR
William E. Sproul
BY
Edgar Tate & Co
ATTORNEYS No. 726,780. PATENTED APR. 28, 1903.
W. E. SPROUL.
PILE DRIVER.
APPLICATION FILED JUNE 4, 1902.
NO MODEL. 14 SHEETS—SHEET 7.
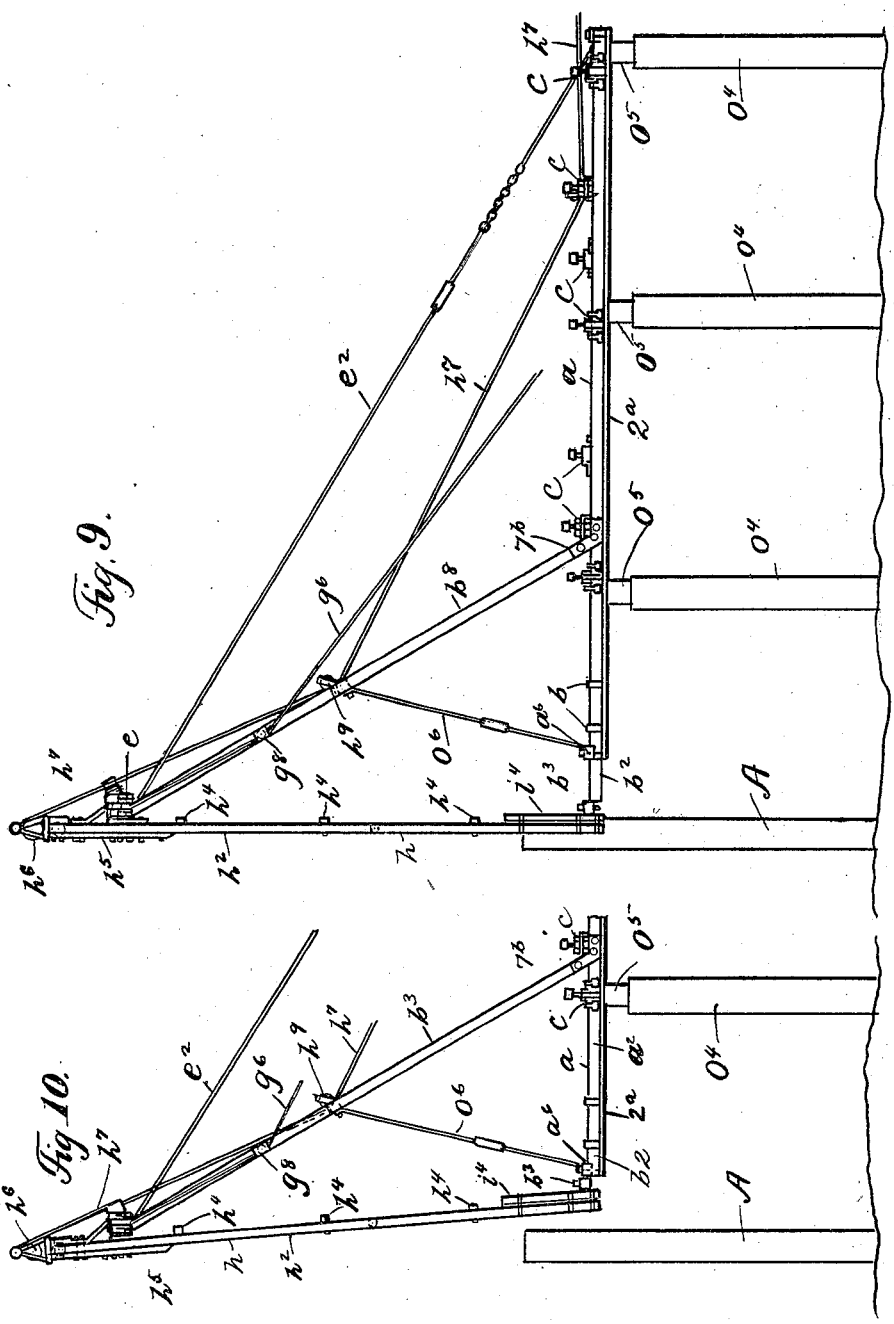
WITNESSES
INVENTOR
William E. Sproul
BY
Edgar Tate
ATTORNEYS

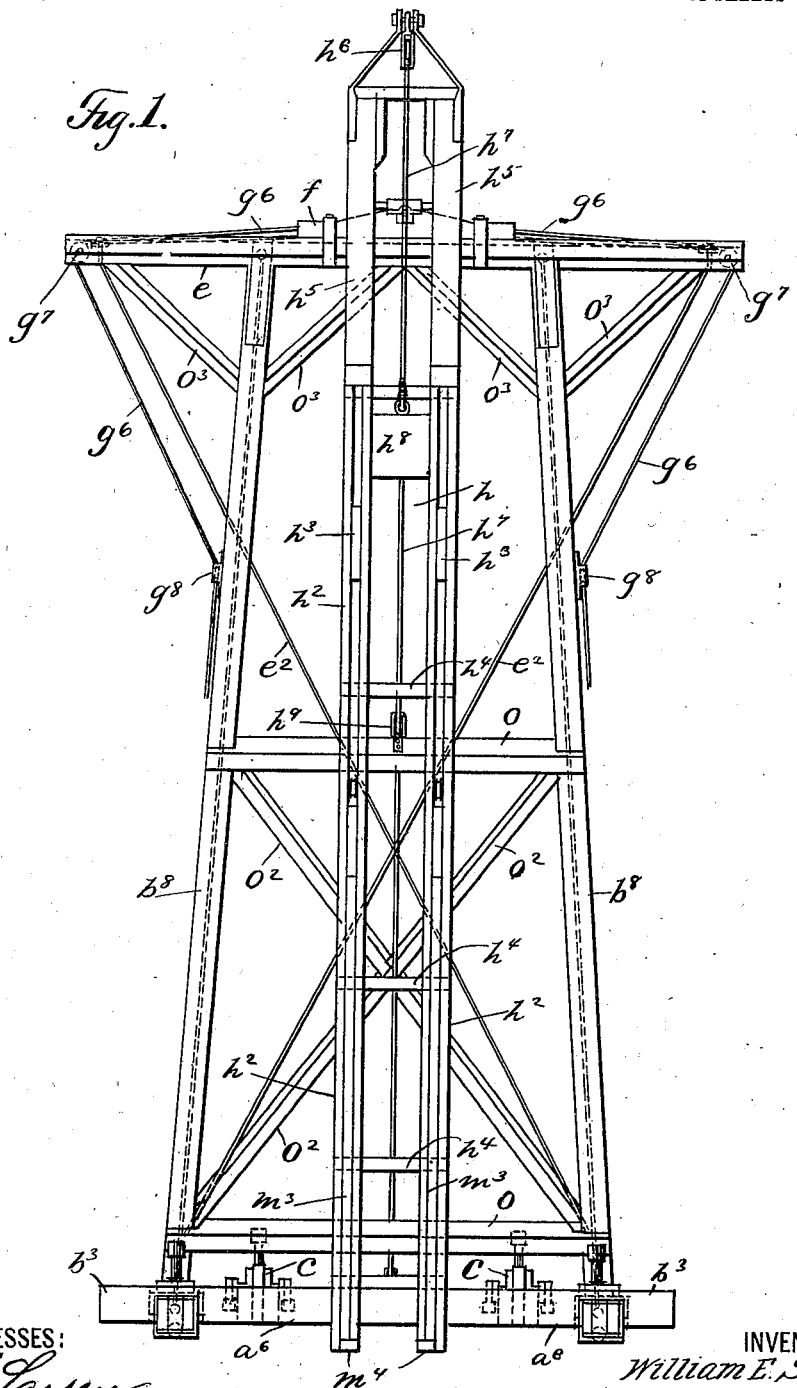

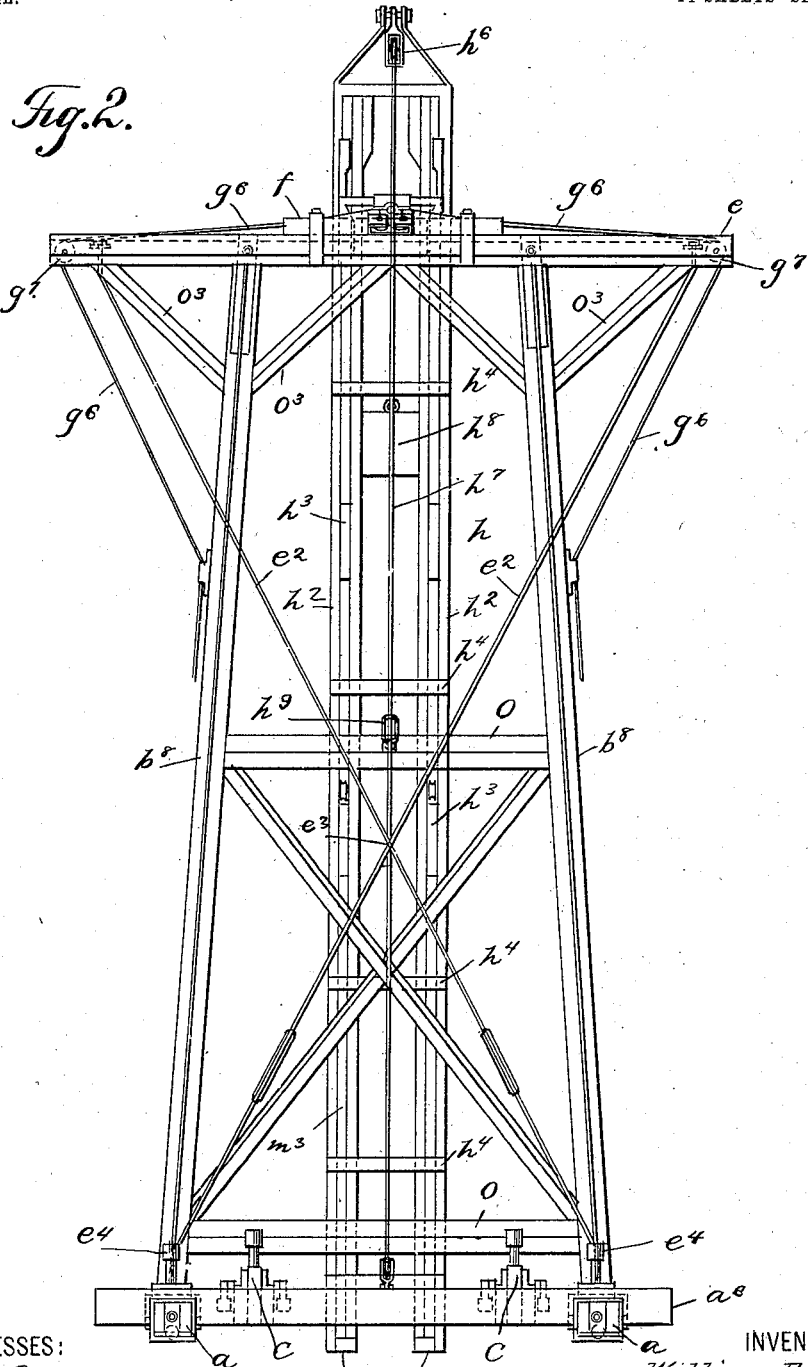

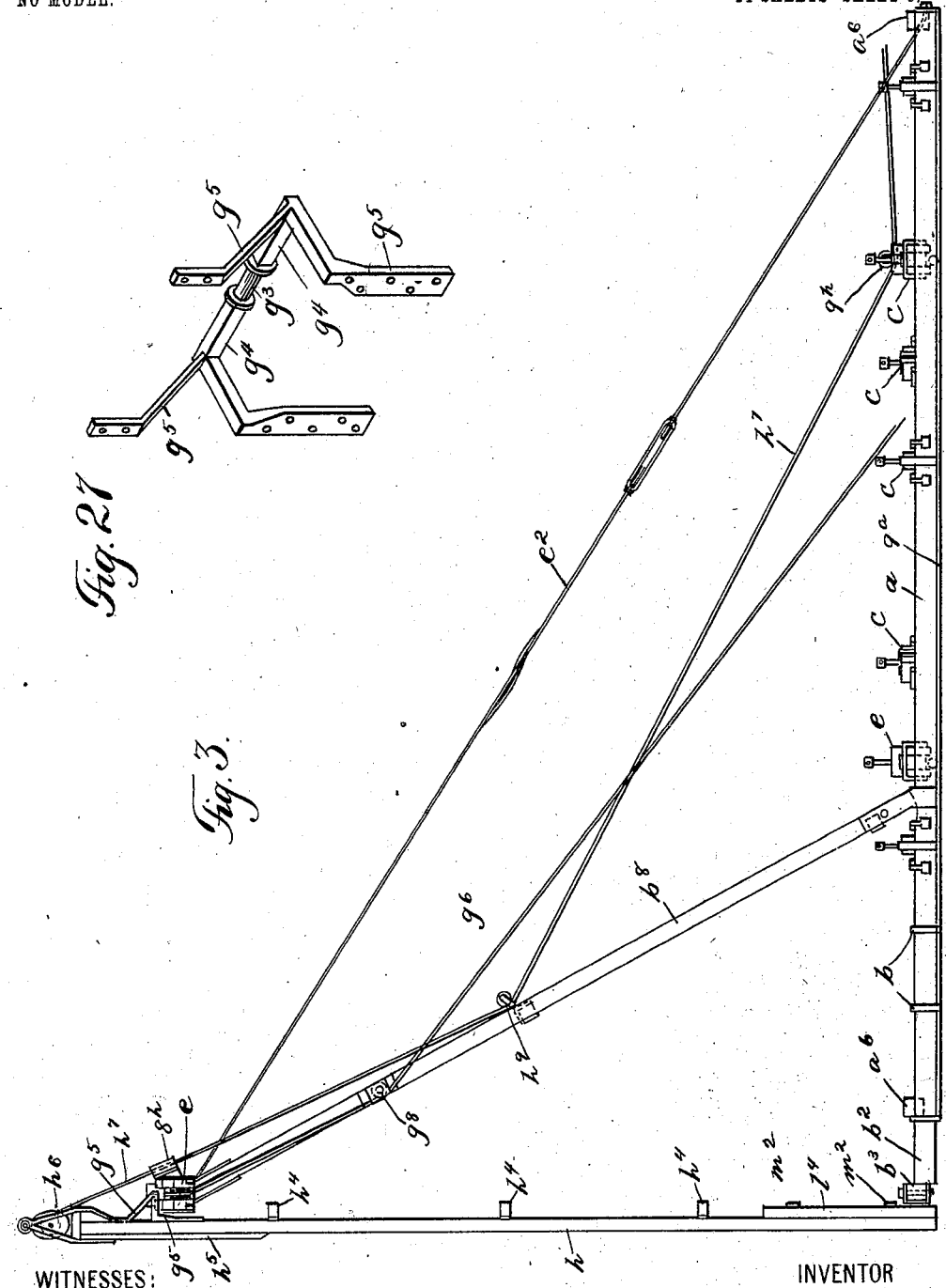

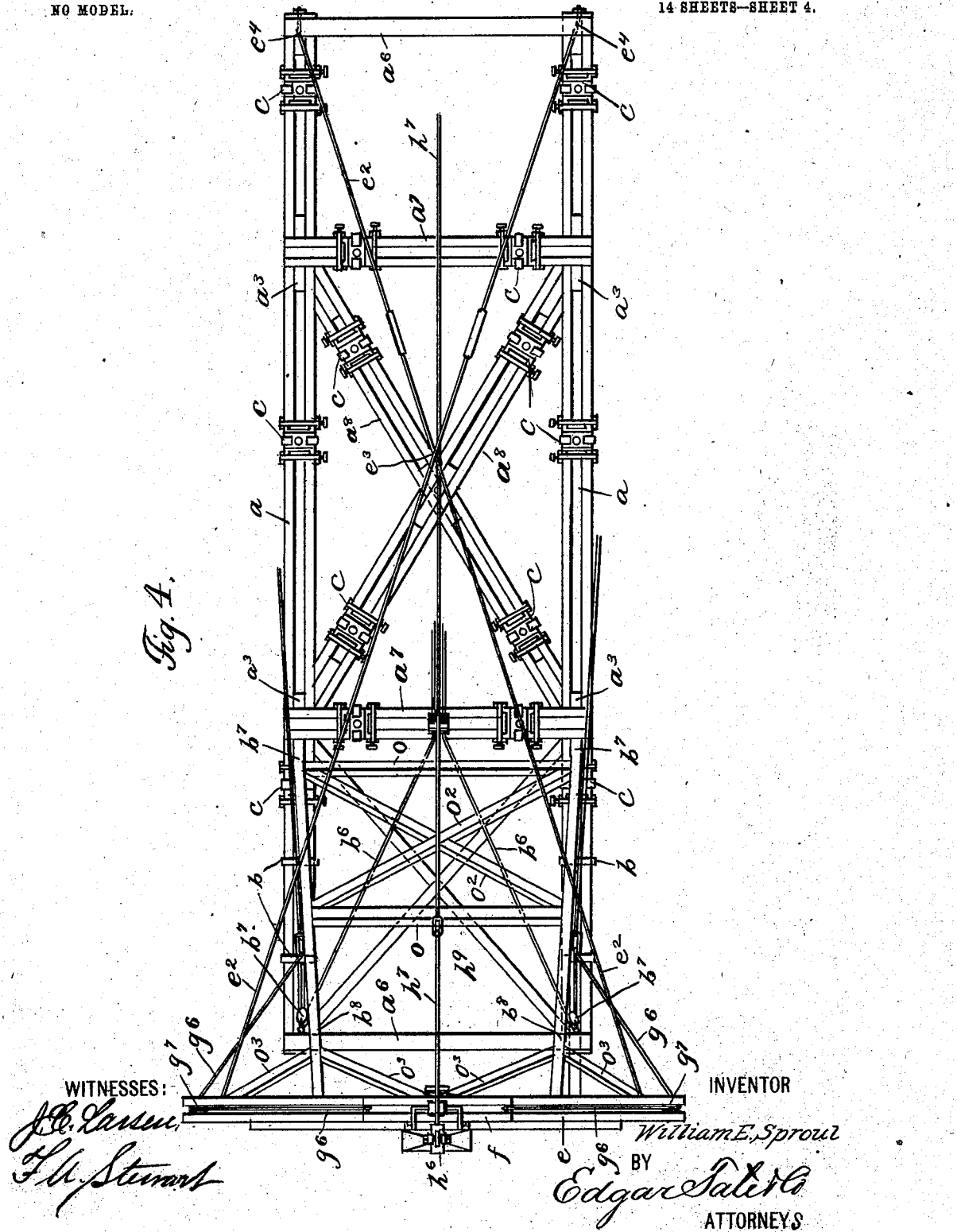

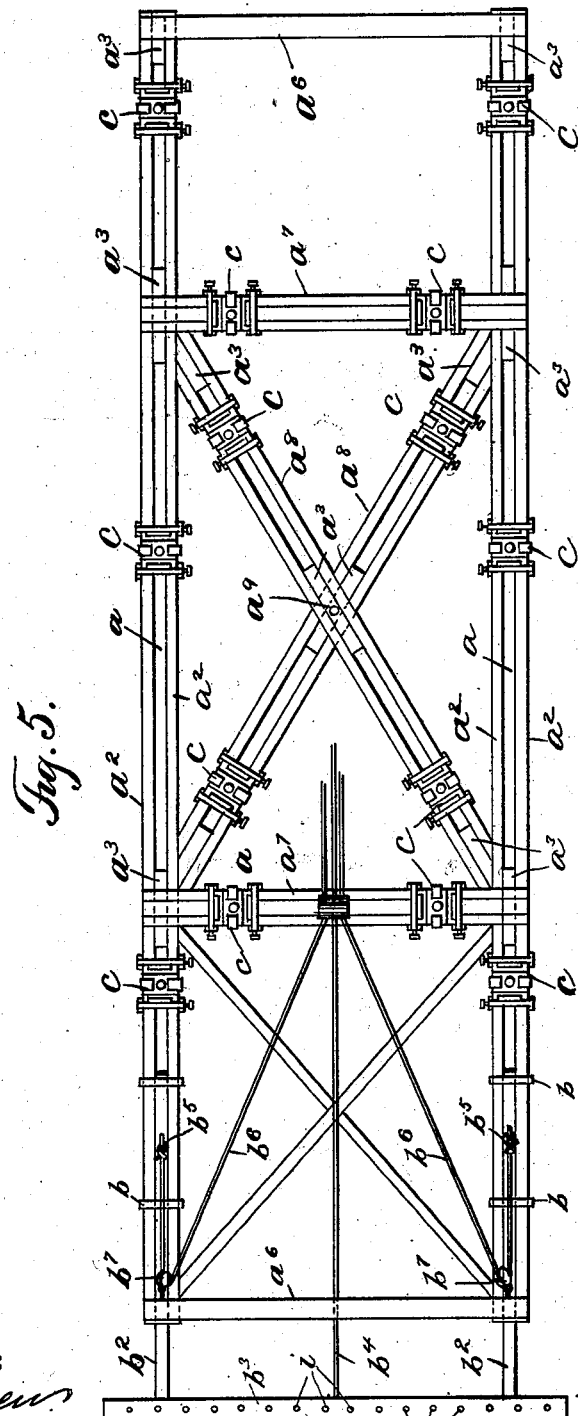

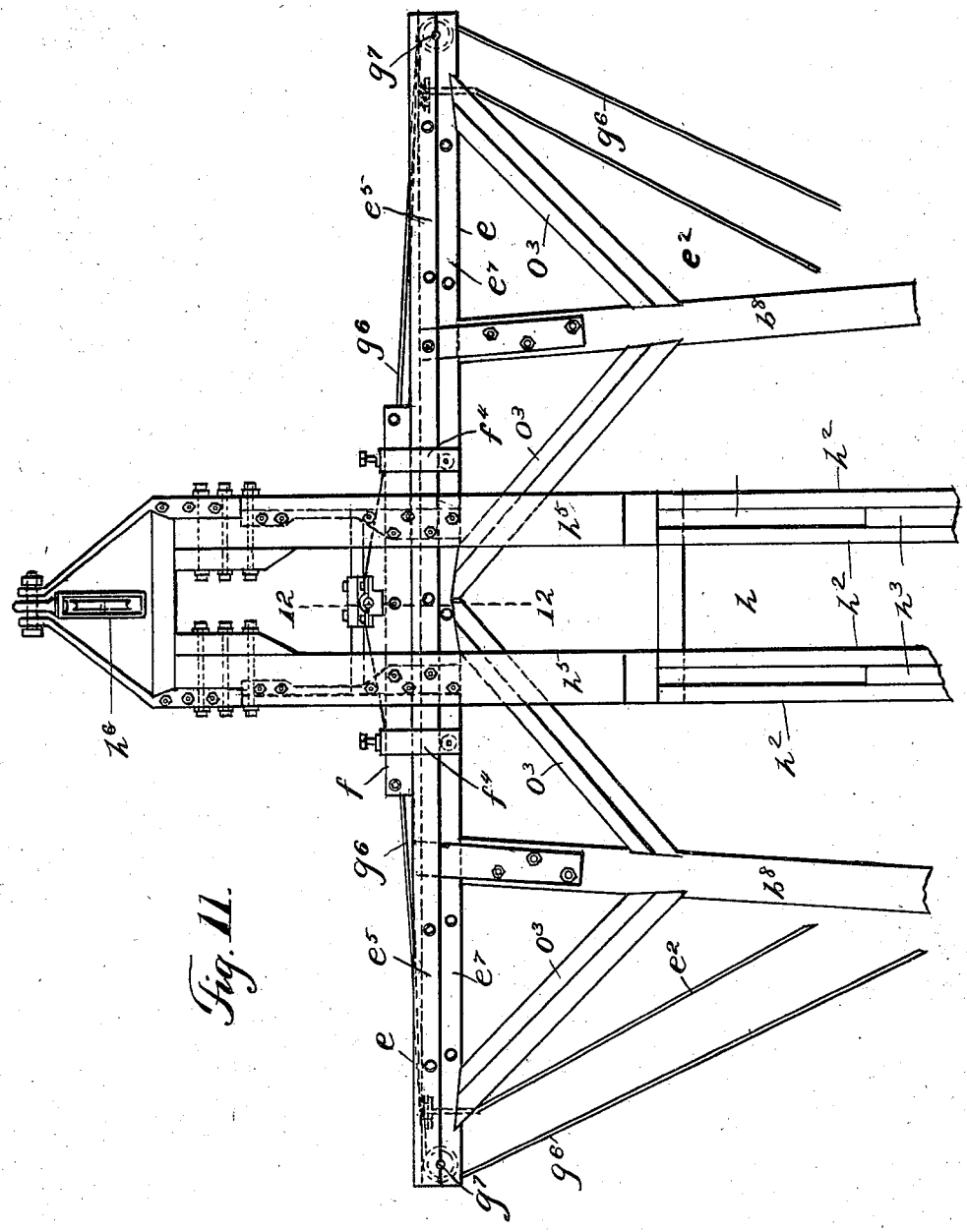

No. 726,780. PATENTED APR. 28, 1903.
W. E. SPROUL.
PILE DRIVER.
APPLICATION FILED JUNE 4, 1902.
NO MODEL. 14 SHEETS—SHEET 9.
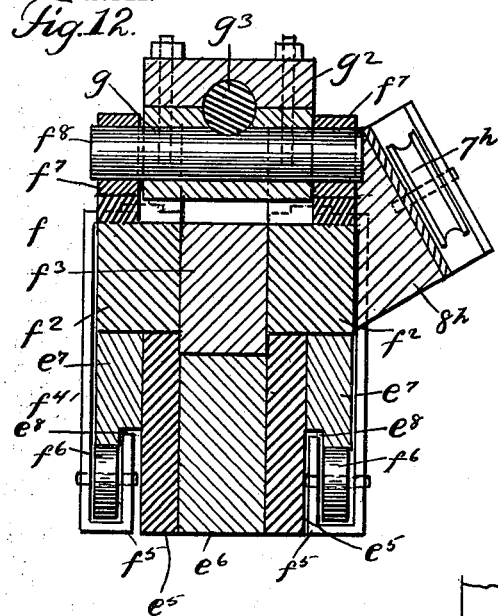
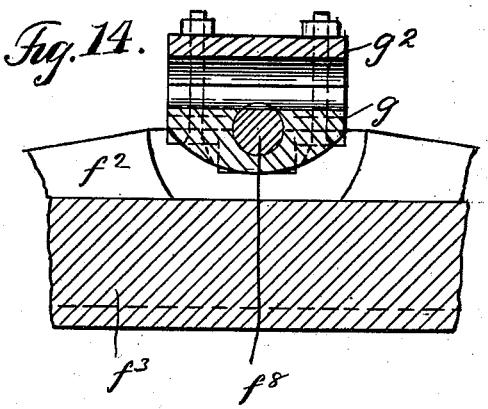
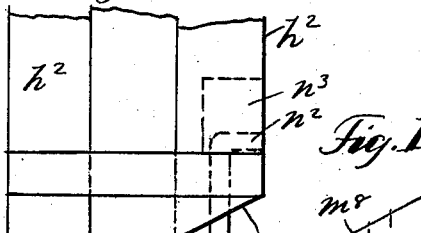
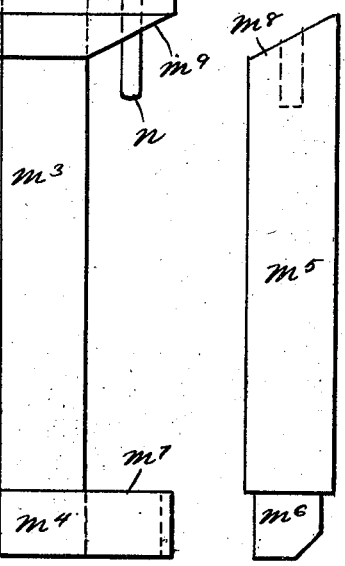
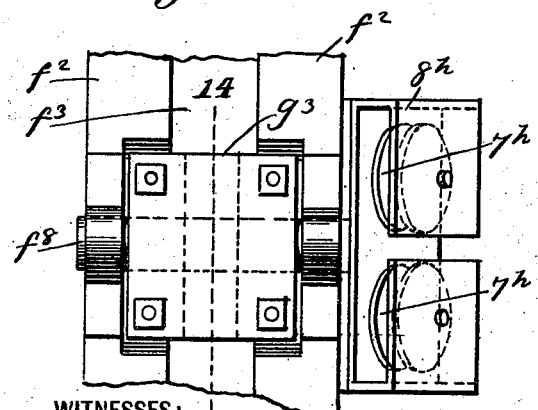
WITNESSES:
J. Chr. Larsen
F. A. Stewart
INVENTOR
William E. Sproul
BY
Edgar Tate & Co
ATTORNEYS
THE NORRIS PETERS CO., PHOTO-LITHO., WASHINGTON, D. C.

No. 726,780. PATENTED APR. 28, 1903.
W. E. SPROUL.
PILE DRIVER.
APPLICATION FILED JUNE 4, 1902.
NO MODEL. 14 SHEETS—SHEET 10.
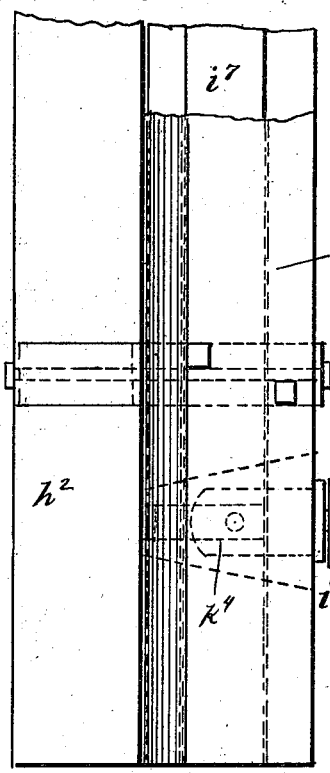
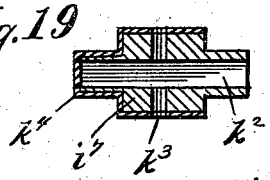
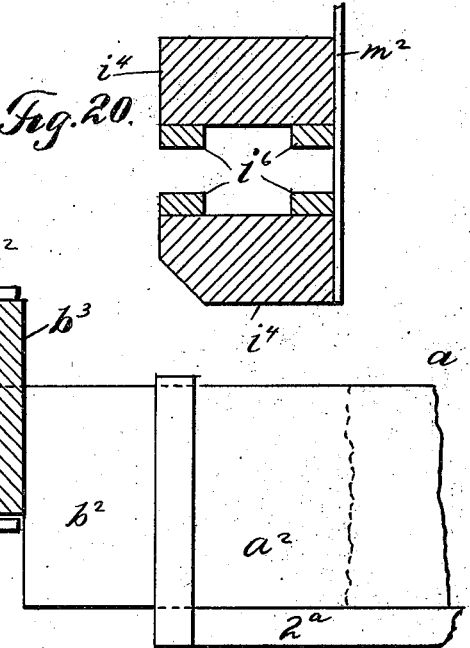
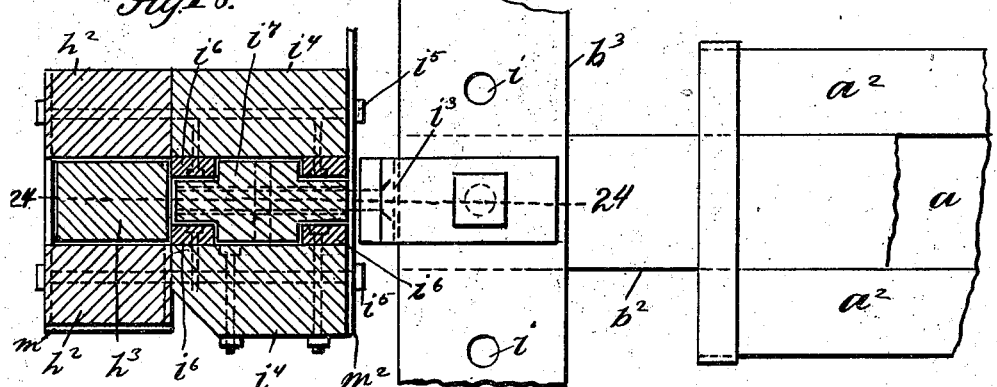
INVENTOR
William E. Sproul
BY Edgar Tate & Co
ATTORNEYS

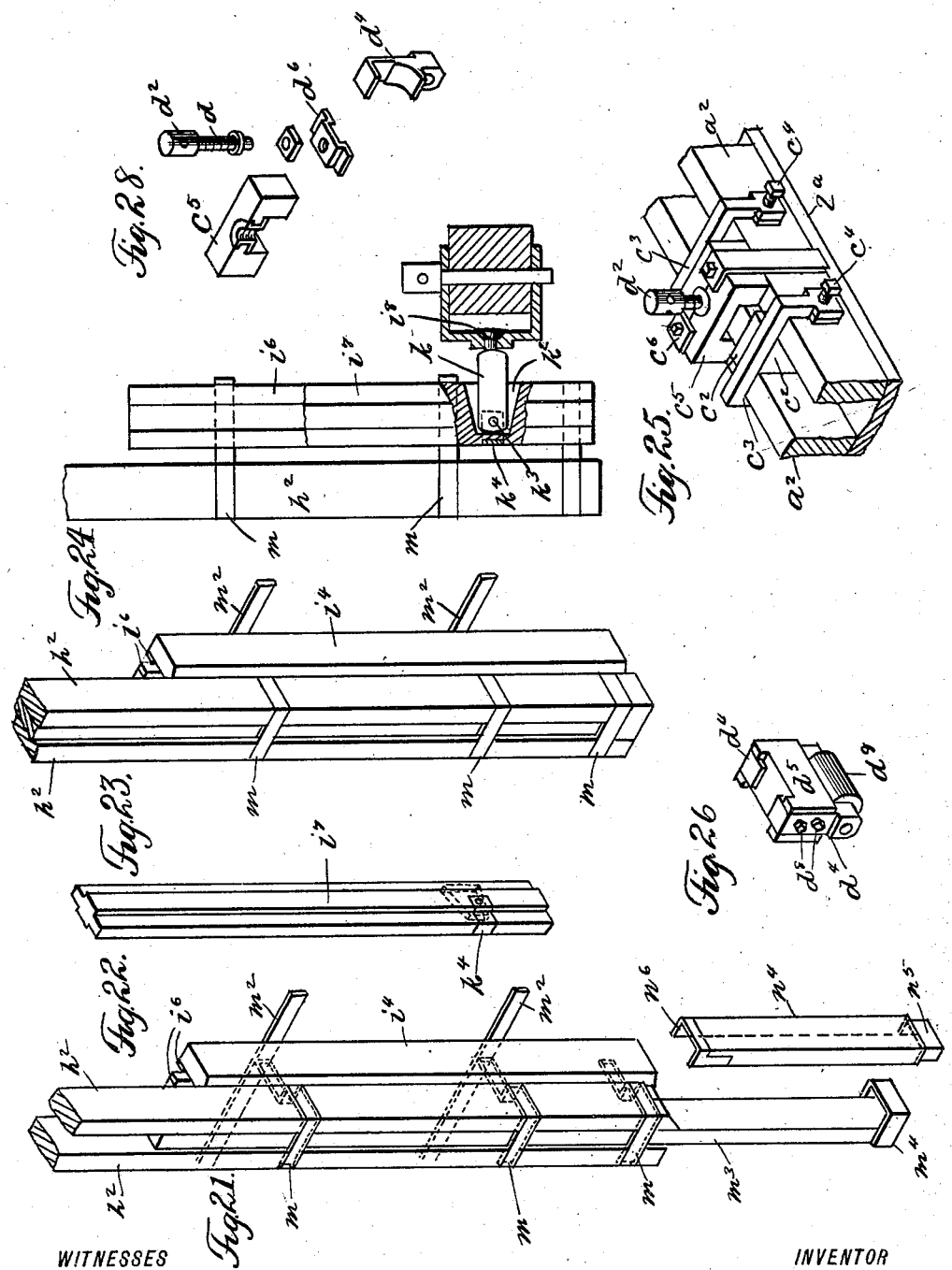

No. 726,780. PATENTED APR. 28, 1903.
W. E. SPROUL.
PILE DRIVER.
APPLICATION FILED JUNE 4, 1902.
NO MODEL. 14 SHEETS—SHEET 12.
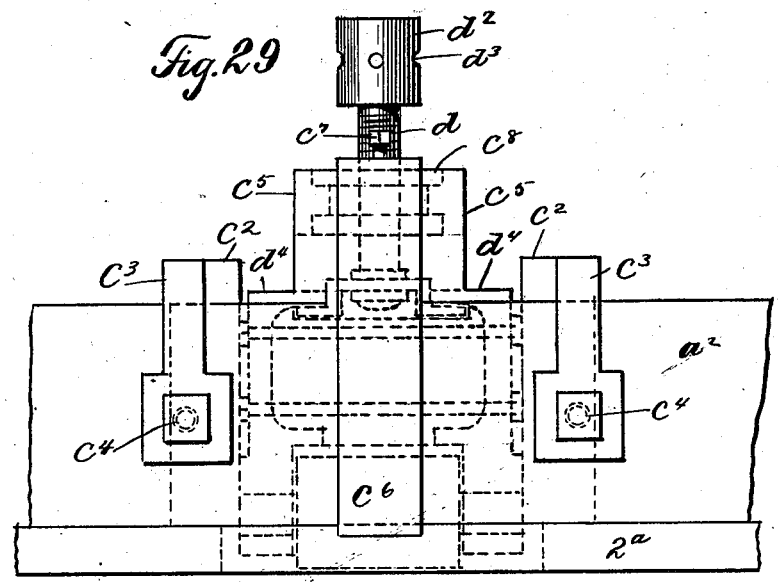
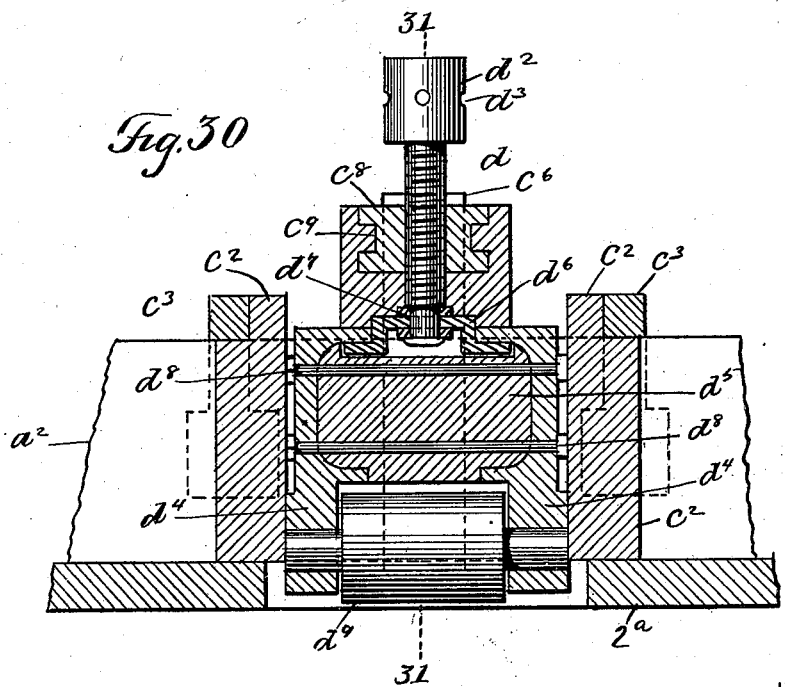
WITNESSES:
INVENTOR
William E. Sproul
BY Edgar Tate & Co
ATTORNEYS No. 726,780. PATENTED APR. 28, 1903.
W. E. SPROUL.
PILE DRIVER.
APPLICATION FILED JUNE 4, 1902.
NO MODEL. 14 SHEETS—SHEET 13.
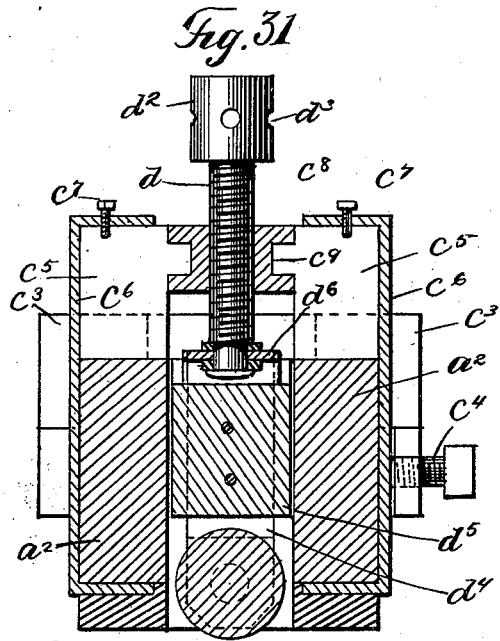
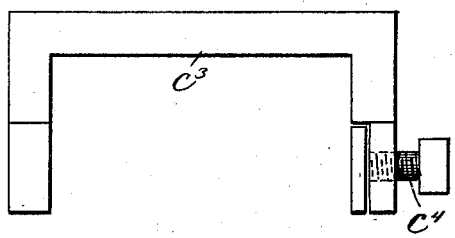
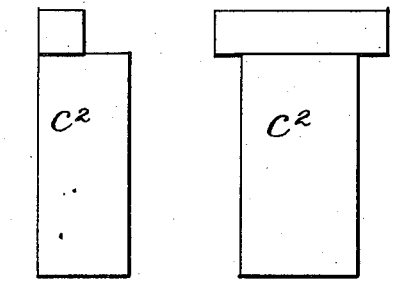
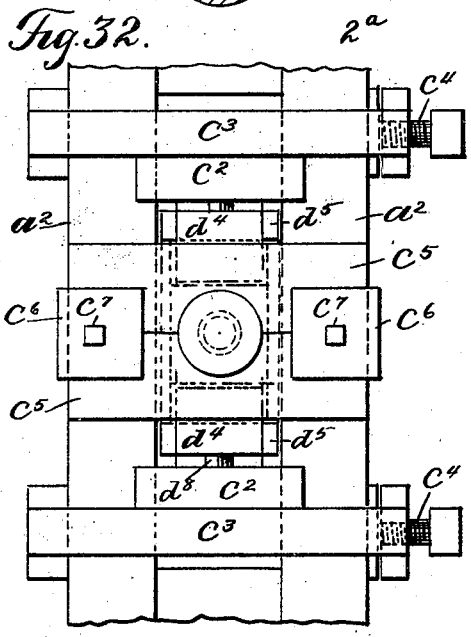
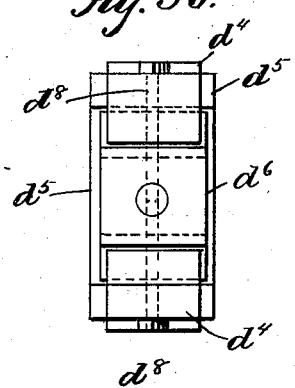
WITNESSES:
INVENTOR
William E. Sproul
BY
Edgar Tate & Co
ATTORNEY

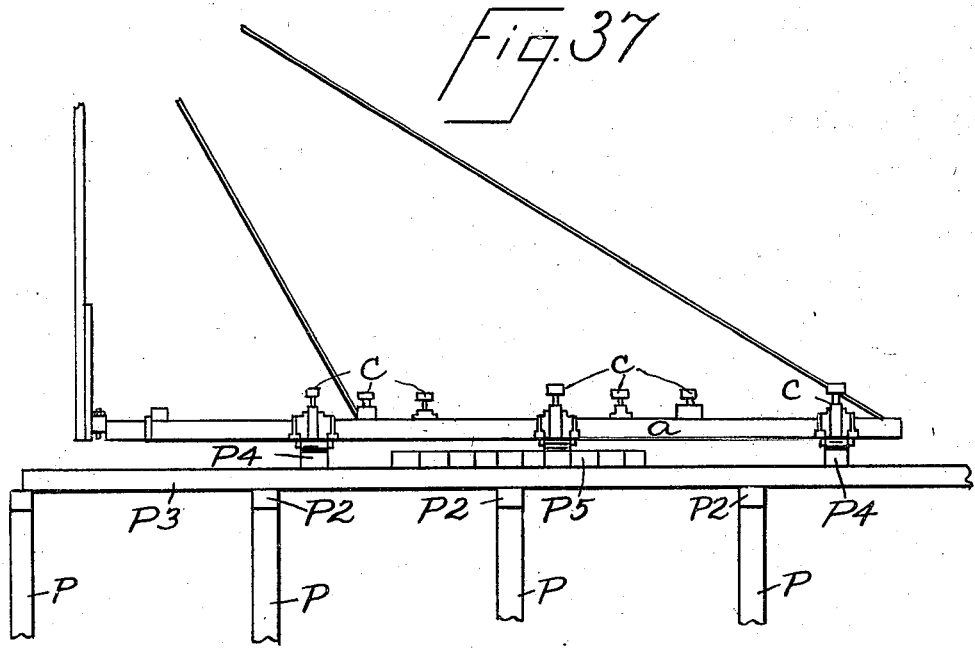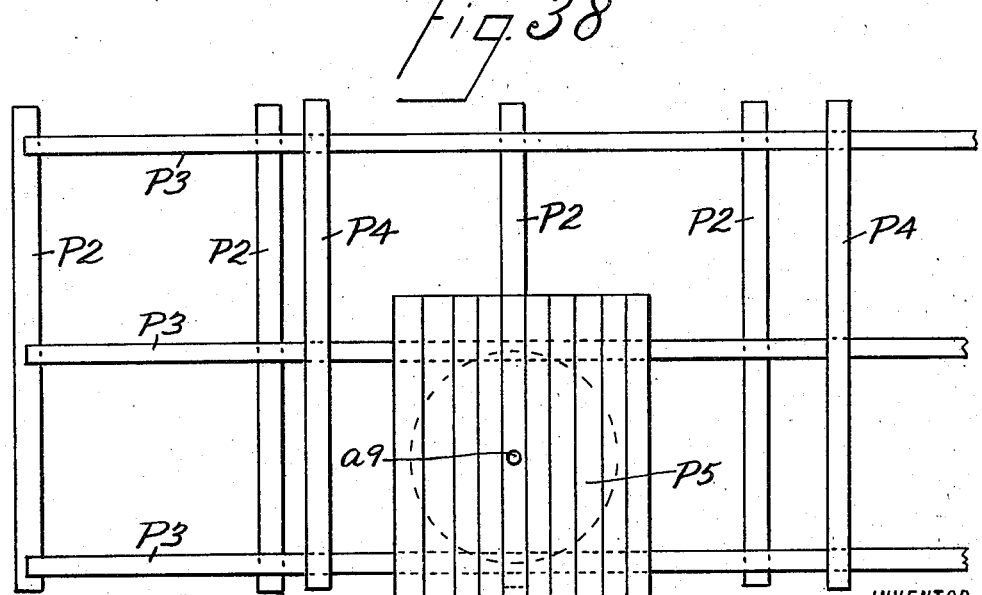

UNITED STATES PATENT OFFICE.

WILLIAM EVERETT SPROUL, OF GUATEMALA, GUATEMALA.

PILE-DRIVER.

SPECIFICATION forming part of Letters Patent No. 726,780, dated April 28, 1903.

Application filed June 4, 1902. Serial No. 110,245. (No model.)

*To all whom it may concern:*

Be it known that I, WILLIAM EVERETT SPROUL, a citizen of the United States, residing at Guatemala city, Guatemala, have invented certain new and useful Improvements in Pile-Drivers, of which the following is a full and complete specification, such as will enable those skilled in the art to which it appertains to make and use the same.

The object of this invention is to provide an improved pile-driver by means of which piles may be driven at an angle to a vertical line and also below the base of the pile-driver, a further object being to provide a pile-driver which may be easily and conveniently moved laterally, forwardly, and backwardly, or turned, as on a pivot, a further object being to provide a pile-driver in which the hammer-guide may be conveniently moved transversely of the base of the apparatus and swung laterally, so as to facilitate the driving of piles at an angle, a further object being to provide a pile-driver having an upright frame portion which supports the hammer-guide and which is provided with a laterally-movable carriage with which the hammer-guide is connected, the base-frame of the apparatus being also provided with a forwardly and backwardly moving member with which the lower end of the hammer-guide is connected, so as to move laterally thereon; and with these and other objects in view the invention consists in a pile-driver constructed as hereinafter described and claimed.

In the drawings forming part of this specification, in which the separate parts of my improvement are designated by the same reference characters in each of the views, Figure 1 is a front view of my improved pile-driver; Fig. 2, a back view thereof; Fig. 3, a side view thereof; Fig. 4, a top plan view thereof; Fig. 5, a plan view of the bottom or base frame of the pile-driver with the upright portion removed; Fig. 6, a front view, on a reduced scale, showing one method of operating the apparatus; Fig. 7, a view similar to Fig. 6, showing another method of operating the apparatus; Fig. 8, another view similar to Fig. 6, showing still another method of operating the apparatus. Figs. 9 and 10 are side views of the apparatus, showing the parts in a different position; Fig. 11, a front view of a top portion of the apparatus on an enlarged scale; Fig. 12, a section on the line 12 12 of Fig. 11 and showing the carriage of the hammer-guide and the support thereof in section; Fig. 13, a plan view of a part of the carriage shown in Fig. 12; Fig. 14, a section on the line 14 of Fig. 13; Fig. 15, a front view of the lower end of the left-hand leg of the hammer-guide, showing the method of extending the lower end of said hammer-guide when it is desired to drive piles below the bottom frame of the apparatus; Fig. 16, a side view of a detail of a part of the construction employed in connection with the construction shown in Fig 15; Fig. 17, a side view of the construction shown in Fig. 15 of the lower end of the hammer-guide and showing its connection with the main base-frame; Fig. 18, a plan view of the construction shown in Fig. 17; Fig. 19, a transverse section of a device which forms a part of the swivel connection between the lower end of the hammer-guide and the main frame of the machine; Fig. 20, a sectional plan view similar to that shown in Fig. 18 and showing a part only of the construction shown in Fig. 18; Fig. 21, a perspective inside view of one leg of the hammer-guide extended and showing a modified locking device; Fig. 22, a perspective view of a sliding key-piece used in connection with the construction shown in Figs. 21 and 18; Fig. 23, a view similar to Fig. 21, but showing the leg of the hammer-guide not extended, the position of the parts being that which they occupy when driving piles on a level with the base of the apparatus; Fig. 24, a partial section on the line 24 of Fig. 18; Fig. 25, a perspective view of a lifting device connected with the base-frame of the apparatus and a part of which is shown, said lifting device or devices being intended to operate so as to raise the apparatus and support it upon rollers in such position that it may be moved longitudinally and laterally turned on a pivot; Fig. 26, a perspective view of a roller and its support used in the lifting device shown in Fig. 25; Fig. 27, a perspective view of a combination shaft and brackets for connecting the hammer-guide with the hammer-guide carriage. Fig. 28 shows in perspective a number of details of the construction employed in Fig. 25; Fig. 29, a side view of the construction shown in Fig. 25 and showing the same on an enlarged scale; Fig. 30, a longitudinal central section of the construction shown in Figs. 25 and 29 and 31 and 32; Fig. 31, a transverse section on the line 31 of Fig. 30; Fig. 32, a plan view of the construction shown in Fig. 31; Fig. 33, a side view of a detail of the construction shown in Figs. 29 to 32, inclusive. Figs. 34 and 35 are opposite views of a detail of the construction shown in Figs. 29 to 32, inclusive; Fig. 36, a top plan view of a lifting-block forming a part of the construction shown in Figs. 29 to 32, inclusive; Fig. 37, a side view of a part of my improved pile-driving apparatus and showing a support on which the same may be moved; Fig. 38, a plan view of the support.

In the construction of my improved pile-driver, reference being made to Figs. 1 to 5, inclusive, I provide a base-frame, which comprises two horizontal and parallel side members $a$, preferably composed of two separate parts $a^2$, which are separated at intervals by blocks $a^3$, as clearly shown in Fig. 5, and said side members are connected at the ends by transverse end members $a^6$ or in any desired manner and also intermediate of the end by transverse members $a^7$, two of which are shown, and between the intermediate members $a^7$ are diagonally-arranged members $a^8$, which intersect each other at the center of said base-frame, as shown at $a^9$, and the diagonally-arranged members $a^8$ are also preferably composed of separate parallel parts separated by blocks $a^3$, the same as the separate parts of the side members $a$.

The separate side members $a$ are preferably provided near their front ends with bands $b$, and mounted in the front ends of said side members and between the separate parts $a^2$ thereof are slides $b^2$, connected at their front ends by a cross-head $b^3$, movable back and forth, as hereinafter described, and which forms a support or connection for the lower end or bottom of the vertically-arranged hammer guide, as hereinafter described.

The separate side members $a$ of the base-frame are also provided at intervals with lifting devices $c$, three of which are shown, and the intermediate transverse members $a^7$ are provided with similar lifting devices, two of which are shown, and the diagonal base-frame members $a^8$ are also provided with similar lifting devices, four of which are shown, two in each of said members, and all of these lifting devices are designated as a whole by the reference-letter $c$, and said lifting devices are of the construction shown in Figs. 25 and 29 to 36, inclusive. The bottom of said side members $a$ of the base-frame is preferably provided with a plate $2^a$, and in constructing the lifting devices $c$ I place between the separate parts $a^2$ of the side members $a$ of the base-frame blocks $c^2$, which are provided with cross-heads, as shown in Figs. 32, 34, and 35, which rest on the separate parts $a^2$ of the said side members $a$ of the base-frame, and yoke-shaped bands $c^3$ are passed over the top ends of said blocks $c^2$ and adjacent the cross-heads at the top thereof and are clamped in position by a screw or screws $c^4$, operating in connection with the parts $a^2$, and between the yokes $c^3$ are blocks $c^5$, which are held in place by plates $c^6$, the upper ends of which overlap the opposite blocks $c^5$ and the lower ends of which pass beneath the separate parts or bars $a^2$, as clearly shown in Fig. 31, and the upper ends of said yoke-shaped plates are connected with the block $c^5$ by screws $c^7$ or in any desired manner.

Placed between and supported by the upper ends of the blocks $c^5$ is a nut $c^8$, provided with a groove in which fits a projection or projections $c^9$, formed on said blocks and by which said nut is securely held in place, and passing downwardly through the nut $c^8$ is a screw $d$, provided with a head $d^2$, having radial holes $d^3$ adapted to receive a turning bar or lever, as will be readily understood.

Between the blocks $c^2$ and the parts $a^2$ are placed vertically-movable blocks $d^4$, (shown in section in Fig. 30,) and these blocks are separated longitudinally of the base-frame by an intermediate block $d^5$, the ends of which are countersunk in the blocks $d^4$, and held between the upper ends of the blocks $d^4$ is an angle-plate $d^6$, the ends of which are countersunk in the block $d^5$ and the central portion of which projects above the upper ends of the blocks $d^4$, and the lower end of the screw $d$ passes through the central portion of the angle-plate $d^6$, as clearly shown in Fig. 30, and is connected therewith so as to freely turn therein, as shown at $d^7$. The blocks $d^4$ and $d^5$ are connected by bolts $d^8$, and between the lower ends of the blocks $d^4$ is mounted a roller $d^9$. As thus constructed it will be seen that the blocks $c^5$, which support the nuts $c^8$, are supported by the bars $a^2$ of the side members of the base-frame, and by turning the screw $d$ the supports of the roller $d^9$ may be raised or lowered, according to the direction in which the screw $d$ is turned, and said roller may be projected below the bottom of the base-frame or raised above the same, as will be readily understood.

As hereinbefore stated, all the lifting devices $c$ are of the same construction, and those lifting devices in the parallel side members $a$ of the base-frame may be operated so as to raise said frame and the upper structure of the pile-driver above the support or supports thereof, and the entire apparatus may be moved laterally or sidewise in either direction, as will be readily understood, the rollers $d^9$ being arranged longitudinally of the base-frame. In the lifting devices $c$, which are placed in the intermediate cross-heads $a^7$, the rollers $d^9$ are arranged transversely of the base-frame, and if it is desired to move the pile-driver longitudinally or forwardly or backwardly these lifting devices are manipulated so as to depress the rollers $d^9$ below the bottom of the base-frame, in which position of the parts the pile-driver may be moved longitudinally or forwardly or backwardly, as will be readily understood. In the diagonally-arranged members $a^8$ of the base-frame the rollers $d^9$ are arranged longitudinally of said members, and by reason of the diagonal arrangement of said members when the rollers $d^9$ in said lifting devices are depressed the pile-driver may be turned on a central pivot and swung in a complete circle, the rollers $d^9$ in the lifting devices in said diagonal members supporting the entire apparatus and forming bearings to permit of the turning of the pile-driver, as described, and in this operation a suitable pivot-pin is passed through a central opening at $a^9$ and into the support of the pile-driver, or said pile-driver may be turned in a circle without said central pivot-pin.

The cross-head $b^3$, which is connected with the slides $b^2$ at the front end of the base-frame, is provided with a rope or cable $b^4$, which is connected therewith in any desired manner and which passes forwardly and may be connected with a windlass, engine, or other operating device, and secured to the inner ends of the slides $b^2$ at $b^5$ in any desired manner are other ropes or cables $b^6$, which are passed around pulleys $b^7$, secured to the front end of the base of the main frame and which are also passed backwardly and may be connected with a windlass, engine, or any other operating device, and by means of the ropes or cables $b^4$ and $b^6$ the cross-head $b^3$ may be forced outwardly or forwardly and drawn backwardly whenever desired.

Connected with the side members $a$ of the base-frame at a predetermined point and preferably just forward of the forward intermediate transverse member $a^7$, as shown at $7^b$ in Fig. 3, are upwardly and forwardly directed bars or supports $b^8$, with the upper ends of which is connected a transverse support $e$ and with the opposite ends of which are connected bars or stay-rods $e^2$, which extend backwardly and which preferably cross each other at $e^3$ and are connected with the rear end of the base-frame at $e^4$, and the transverse support $e$ is shown in Figs. 1, 2, 3, and 4 in front, back, end, and plan views, and an enlarged front view thereof is given in Fig. 11, and other views thereof are given in other figures of the drawings, and this support is preferably composed, as shown in cross-section in Fig. 12, of parallel side plates $e^5$, separated by a longitudinal bar $e^6$, and secured to the outer sides of the plates $e^5$, at the top thereof, are bars $e^7$, the bottoms of which are provided adjacent to the plates $e^5$ with a longitudinal groove $e^8$.

Mounted on the support $e$ is a sliding carriage $f$, (shown in Figs. 1 to 5, inclusive, and also in Fig. 11, and a cross-section of which is shown in Fig. 12 and details thereof being shown in Figs. 13 and 14,) and this carriage is composed of side bars $f^2$ and a central bar $f^3$, which rests on the central member $e^6$ of the support $e$ and the bottom portion of which fits between the tops of the side plates $e^5$ of the support $e$, and said carriage is provided with side hangers $f^4$, having inwardly and upwardly directed brackets $f^5$, and mounted in the lower ends of said hangers are rollers $f^6$, which bear on the bottoms of said bars or bearings $e^7$ of the support $e$, as clearly shown in Fig. 12. Mounted on the opposite side members $f^2$ of the carriage $f$ and connected therewith in any desired manner are bearings $f^7$, in which is mounted a transverse shaft $f^8$, which passes through a centrally-arranged block $g$, to which is secured a top block $g^2$, and the blocks $g$ and $g^2$ form a bearing for the shaft $g^3$, the ends of which are extended, as shown at $g^4$ in Fig. 27, and provided with arms or brackets $g^5$, which are secured to and support the hammer-guide $h$, and by reason of this construction it will be seen that the lower end of the hammer-guide may be swung laterally or backwardly and forwardly by reason of its connection to the carriage $f$. Connected with the opposite ends of the carriage $f$ are ropes or cables $g^6$, which pass over pulleys $g^7$ in the opposite ends of the support $e$, and said ropes or cables are passed downwardly and backwardly around suitable pulleys or other devices $g^8$, connected with the upright portion of the frame of the pile-driver formed by the upwardly and forwardly directed bars $b^8$, and said ropes or cables are passed downwardly and forwardly and in practice are connected with a windlass or engine, and by the proper manipulation thereof the carriage $f$ may be moved in either direction on the support $e$, as will be readily understood.

The hammer-guide $h$ is composed of two separate vertically-arranged side members, each of which is composed of two parallel parts $h^2$, separated by blocks $h^3$, this construction being similar to the construction of the side members of the base-frame, and the separate vertically-arranged members $h^2$ are preferably connected at their forward sides by transverse bars $h^4$, and the separate side members of the hammer-guide are also provided at the upper ends thereof with front plates $h^5$, which are secured thereto, and mounted in the top of the hammer-guide is a pulley $h^6$, around which passes a rope, cord, or cable $h^7$, which is connected with the hammer $h^8$ and which passes forwardly and downwardly around the pulley $h^9$, connected with the upright portion of the frame of the pile-driver, from which point it is carried forwardly and passes around another pulley $9^h$, connected with the base-frame, and in practice this cord, rope, or cable is connected with an engine and operated in the usual manner. The carriage $f$ is provided at its rear side with a support $8^h$, which supports two pulleys $7^h$, which are arranged closely adjacent, and the hammer rope, cord, or cable $h^7$ is passed between these pulleys, and by reason of this construction the hammer may always be properly operated regardless of the position of the carriage $f$ on the support $e$. The lower end of the hammer-guide $h$ is connected with the cross-head $b^3$, which is connected with the slides $b^2$ in the front end of the base-frame, as hereinbefore described. This connection is made in the following manner, details thereof being shown in Figs. 17 to 20, inclusive: The cross-head $b^3$ is provided, as shown in Fig. 5, with longitudinally-arranged holes $i$, adapted to receive pins $i^2$, as shown in Fig. 17, and a yoke-shaped bracket $i^3$ is connected with the cross-head $b^3$ by means of the pin $i^2$. The lower end of the hammer-guide $h$ or one of the side members thereof is provided with reinforcing vertically-arranged members $i^4$, consisting of plates or bars bolted thereto, as shown at $i^5$, this construction being clearly shown in Figs. 21 to 24, inclusive, and secured to the inner or adjacent sides of the plates or bars $i^4$ are vertically-arranged strips or keepers $i^6$, (see Figs. 18, 21, and 23,) between which and the bars $i^4$ is placed a vertically-arranged and slidable key-piece $i^7$, which is of the form in cross-section shown in Figs. 18, 19, and 22, and connected with the bracket $i$ at $i^8$ and so as to turn therein is a pivot device $k$, which passes into a slot $k^2$ in the key-piece $i^7$ and which is pivoted thereto by a pivot-pin at $k^3$, and a strengthening-band $k^4$ is secured to the key-piece $i^7$ where the pivot-piece $k$ connects therewith, and by means of this construction the bottom end of the hammer-guide may be moved forwardly and backwardly with the cross-head $b^3$, as will be readily understood.

That part of the hammer-guide shown in Figs. 21 and 23 is the lower end of the left-hand leg or side of said hammer-guide, these views being inside perspective views of said side or leg of the hammer-guide, and in the construction of these parts, as hereinbefore described, I connect with the separate parts or side portions $h^2$ of said leg bands $m$, three of which are shown, and these bands extend transversely across the front of the said leg or side of the hammer-guide and backwardly transversely of the inner side thereof and transversely across the rear face of the inner side member $h^2$ thereof and then backwardly across the inner face of the corresponding piece $i^4$, as clearly indicated in dotted lines in Fig. 21, and said bands are countersunk in the parts $h^2$ of the hammer-guide leg or side and also in the inner face of the part $i^4$, as indicated in dotted lines in Fig. 18, and these bands are held in place by the bolts $i^5$, which also pass through the cross-bars $m^2$, which connect the separate legs or sides of the hammer-guide at the back thereof. The lower band $m$ at the lower end of the side or member of the hammer-guide is not connected with a cross-bar $m^2$; but this band may also be secured in place by bolts $i^5$, if desired. I also provide means for extending the lower end of the hammer-guide when it is desired to drive piles below the level of the base-frame of the apparatus, and in Figs. 15 and 16 I have shown one form of construction for this purpose and in Figs. 21 and 23 another construction designed for the same purpose. Each of the forms of this construction above referred to involves a vertically-arranged slide $m^3$, mounted in the lower ends of the legs or sides of the hammer-guide and provided at the lower end with a band $m^4$, and these slides may be raised and lowered in any desired manner or by any preferred means, and in Figs. 15 and 21 the said slides are shown in their lowered or partially-lowered position, and in Fig. 23 the said slide is shown in its raised position.

In the construction shown in Fig. 15 I employ a supplemental leg-piece $m^5$, (shown in Fig. 16,) and the lower end $m^6$ of which is so formed as to enter the band $m^4$ at $m^7$, and the upper end of said supplemental leg-piece is beveled or inclined at $m^8$, and the inner part $h^2$ of the separate side members or leg members of the hammer-guide are beveled at their lower ends, as shown at $m^9$, and the supplemental leg-piece $m^5$ in practice is set into the space between the band $m^5$ and the beveled surface $m^9$ and is locked therein by a vertically-movable piece $n$, mounted in the leg-piece $h^2$, and provided with an angular upper end member $n^2$, moving in the recess or chamber $n^3$ in said leg-piece, and by means of the parts $m^3$ and $m^5$ the lower ends of the separate sides or leg members of the hammer-guide may be extended downwardly, as will be readily understood, the extent of this extension depending on the length of the piece $m^5$.

In the form of construction shown in Fig. 21 I substitute for the supplemental piece $m^5$ another part or member $n^4$, the lower end $n^5$ of which enters the band $m^4$ of the slide $m^3$, and the upper end of which at $n^6$ is adapted to enter beneath the lower band $m$ at the lower end of the side or leg member $h^2$ of the hammer-guide. Any suitable means may be employed, however, for securing the parts $m^5$ or $n^4$ in place, and various forms of construction may be employed for this purpose without departing from the scope of my invention.

The separate sides or parts $b^8$ of the upright portion of the frame of the apparatus are provided with cross-braces $o$, between which are diagonal braces $o^2$, and at the top of the upright portion are diagonally-arranged braces $o^3$, which connect with the horizontal support $e$ of the hammer-guide carriage; but it will be apparent that the upright portion of the frame of my improved pile-driver may be made in any desired manner, as may also the base-frame, the only object in this connection being to provide a suitable base-frame with the slides $b^2$ and the lifting devices $c$.

In Figs. 6, 7, 8, 9, and 10 I have shown my improved pile-driver mounted on supports $o^4$, connected by cross-bars $o^5$, and I have also shown piles A in the operation of being driven, and the supports $o^4$ also represent piles previously driven and on which the pile-driver is placed; but it will be understood that in the operation of this apparatus when it is desired to move the pile-driver laterally or forwardly or backwardly or to turn the same it must be placed on a floor or support on which the rollers of the lifting devices $c$ may operate. It will also be observed that in Fig. 7 the lower end of the hammer-guide $h$ is extended for the purpose of driving piles below the base-frame of the pile-driver, and a portion of the piles $o^4$ in this figure are shown as so driven.

In Figs. 9 and 10 I have also shown supplemental braces or tie-rods $o^6$, which connect the front end of the base-frame with the central part of the upright portion of the frame of the apparatus; but these devices are not shown in Fig. 3 and may or may not be employed.

From the foregoing description it will be seen that the entire apparatus may be raised and moved forwardly or backwardly whenever desired, that it also may be raised and moved laterally in either direction whenever desired, and that it also may be raised and turned as on a pivot whenever desired. It will also be seen that the hammer-guide is supported by a carriage which moves on a horizontal support and that said hammer-guide may be moved laterally in either direction without moving the framework of the apparatus, and that by reason of the connection of the hammer-guide with the carriage the lower end of the hammer-guide may be swung laterally and forwardly and backwardly, the connection of the lower end of the hammer-guide with the base-frame of the apparatus being such as to permit of this operation. It will also be seen that the lower end of the hammer-guide may be extended, so as to permit of the driving of piles below the base-frame of the apparatus, and this position of the parts is shown in Fig. 7, the lower end of the hammer-guide being extended for the purpose specified.

In Fig. 6 I have shown the lower end of the hammer-guide without the extension feature or the extension feature thereof being closed, and in Fig. 8 I have shown the lower end of the hammer-guide swung to the left, so as to drive a pile at an angle to the vertical center of the pile-driver.

In Fig. 9 I have shown the separate parts of the apparatus in their normal position or in the position they occupy when driving ordinary piles, and in Fig. 10 I have given a similar view showing the bottom of the hammer-guide drawn backwardly, so as to disconnect it from the end of the pile which is being driven, the piles in these figures being designated by the reference character A.

It frequently happens in driving a pile that it strikes a rock or obstruction and cannot be driven farther, and in this event it becomes necessary to saw off a part thereof, and with my improvement the lower end of the hammer-guide may be swung backwardly and the pile may be sawed off, as will be readily understood, this position of the hammer-guide being shown in Fig. 10.

In Figs. 37 and 38 are shown means employed for supporting and moving the driver. P represents piles already driven into place and capped by cross-beams $P^2$, which are firmly secured to the piles P by means of spikes, dogs, or otherwise. On the cross-beams $P^2$, I place stringers $P^3$, which are so spaced as to be beneath the rollers $d^9$ of the lifting devices $c$, which are secured to the cross intermediate members $a^7$ and which are arranged for forward or backward movement of the driver; but the side stringers $a$ support the driver upon the stringers $P^3$ when the driver is in use, the rollers only being used when it is desired to move the driver, such movement being accomplished by means of skidding.

When it is desired to move the driver transversely, the driver is raised by means of the lifting devices $c$, just mentioned, and transverse beams $P^4$ are placed beneath the rollers $d^9$ of the lifting devices $c$, secured to the side stringers $a$, and these drivers being manipulated the driver rests upon them and the transverse stringers $P^4$ and may be moved transversely.

If it is desired to swing the driver, a platform $P^5$ may be placed beneath the driver, and when the lifting devices $c$ of the diagonally-arranged members $a^8$ are manipulated and the driver rests upon these rollers and the platform $P^5$ and when a pin is passed through $a^9$ into the platform $P^5$ the driver may be rotated about said pin.

If a wharf is being built which requires a permanent platform, the driver may be moved in any direction by manipulating the set of lifting devices which are arranged for the direction desired, the other sets being elevated out of the way, and if no platform is built for permanent use and longitudinal movement being desired the temporary platform $P^5$ and transverse beams $P^4$ must be removed, and the driver again rests upon the longitudinal stringers $P^3$.

My improved pile-driver is comparatively simple in construction and operation and also comparatively inexpensive, and my invention is not limited to the details of the construction herein shown and described, as many changes therein and modifications thereof may be made without departing from the spirit of my invention or sacrificing its advantages.

Having thus fully described my invention, what I claim as new, and desire to secure by Letters Patent, is—

1. A pile-driver provided with a transversely-movable carriage and a hammer-guide connected therewith and suspended therefrom so as to swing laterally and forwardly and backwardly, the lower end of the hammer-guide being also connected with the base-frame of the apparatus so as to move laterally thereon and forwardly and backwardly, substantially as shown and described.

2. In a pile-driver, a base-frame provided in the side members thereof with depressible rollers by means of which the pile-driver may be raised and moved laterally, substantially as shown and described.

3. A pile-driver, the base-frame of which is provided with transverse members having depressible rollers mounted therein whereby the apparatus may be raised and moved forwardly or backwardly, substantially as shown and described.

4. A pile-driver, the base-frame of which is provided with diagonally-arranged members having depressible rollers mounted therein by means of which the apparatus may be raised and turned on a pivot, substantially as shown and described.

5. A pile-driver provided with a base-frame comprising parallel side members, transverse members and diagonally-arranged central members, all of said members being provided with depressible rollers, whereby the apparatus may be raised and moved forwardly and backwardly, and laterally or turned on a pivot, substantially as shown and described.

6. A pile-driver comprising a base-frame, an upright portion having a transverse support at the top thereof, a carriage movable on said support, means for operating said carriage and a hammer-guide connected with said carriage so as to swing backwardly and forwardly and laterally, said hammer-guide being also provided in the top thereof with a pulley and said carriage being also provided at the rear side thereof with a pair of pulleys and a hammer cable or rope passed around the pulley in the top of the hammer-guide and between the pulleys connected with the carriage, substantially as shown and described.

7. In a pile-driver, a base-frame, slides mounted in the forward end thereof and provided with a cross-head, an upright frame connected with the base-frame and provided at the top with a transverse support, a carriage mounted on said support, a hammer-guide connected with said carriage so as to swing laterally and forwardly and backwardly, the lower end of said hammer-guide being also movably connected with said cross-head, this connection being made by a vertically-movable key-piece connected with the lower end of the hammer-guide, substantially as shown and described.

8. A pile-driver provided with a base and an upright frame portion, a carriage mounted on the upright frame portion, a hammer-guide connected with said carriage so as to swing laterally and forwardly and backwardly, slides mounted in the base-frame and provided with a cross-head and a vertically-movable piece mounted in the bottom of the hammer-guide and loosely connected with said cross-head, substantially as shown and described.

9. A pile-driver, the base-frame of which is provided with lifting devices comprising a vertically-movable roller mounted therein and adapted to be depressed below the frame, and means for depressing and raising said roller, substantially as shown and described.

10. An apparatus of the class described, provided with a base-frame and lifting devices mounted therein, each of which comprises a vertically-movable support, a roller mounted therein and means for depressing and raising said support, substantially as shown and described.

11. An apparatus of the class described, provided with a base-frame and lifting devices mounted therein, each of which comprises a vertically-movable support, a roller mounted therein and means for depressing and raising said support, consisting of a vertically-arranged screw connected with and adapted to turn in said support, substantially as shown and described.

12. A pile-driver comprising a base-frame, having an upright end support, a carriage mounted at the top of said support and movable transversely of the base-frame, a hammer-guide suspended from said carriage so as to swing forwardly, backwardly and laterally, a slide member mounted in the base-frame and provided with a cross-head, and means whereby the lower end of the hammer-guide may be connected with said slide member and moved thereon transversely of the base-frame, substantially as shown and described.

13. A pile-driver comprising a base-frame having an upright end support, a carriage mounted at the top of said support and movable transversely of the base-frame, a hammer-guide suspended from said carriage so as to swing forwardly, backwardly and laterally, a slide member mounted in the base-frame and provided with a cross-head, and means whereby the lower end of the hammer-guide may be connected with said slide member and moved thereon transversely of the base-frame, said base-frames being also provided with depressible rollers whereby the driver may be raised and moved in any desired directions, substantially as shown and described.

In testimony that I claim the foregoing as my invention I have signed my name, in presence of the subscribing witnesses, this 12th day of May, 1902.

WILLIAM EVERETT SPROUL.

Witnesses:
CHARLES GRAY,
WILLIAM THOMAS PAMAY.